United States Patent
Yamada et al.

(10) Patent No.: US 6,252,002 B1
(45) Date of Patent: Jun. 26, 2001

(54) METHYL METHACRYLATE RESIN COMPOSITION

(75) Inventors: Taiji Yamada; Takashi Sakamoto, both of Ehime (JP)

(73) Assignee: Sumitomo Chemical Company Limited, Osaka (JP)

( * ) Notice: Subject to any disclaimer, the term of this patent is extended or adjusted under 35 U.S.C. 154(b) by 0 days.

(21) Appl. No.: 09/449,416

(22) Filed: Nov. 29, 1999

(30) Foreign Application Priority Data

Nov. 30, 1998 (JP) .................................................. 10-339434

(51) Int. Cl.$^7$ ....................................................... C08L 33/12
(52) U.S. Cl. ............................................. 525/228; 525/226
(58) Field of Search ...................................... 525/226, 228

(56) References Cited

U.S. PATENT DOCUMENTS 5,726,268   3/1998  Sakamoto .

FOREIGN PATENT DOCUMENTS 55-007868  * 1/1980 (JP) .
10-259286    9/1998 (JP) .
10-259287    9/1998 (JP) .

OTHER PUBLICATIONS

Patent Abstracts of Japan, vol. 005, No. 089 (C–058), Jun. 10, 1981 & JP 56 034715 A (Asahi Chem Ind Co Ltd), Apr. 7, 1981.
Patent Abstracts of Japan, vol. 1997, No. 12, Dec. 25, 1997 & JP 09 207196 A (Sumitomo Chem Co Ltd) Aug. 12, 1997.
Patent Abstracts of Japan, vol. 1998, No. 14, Dec. 31, 1998 & JP 10 259286 A (Sumimoto Chem Co Ltd) Sep. 29, 1998.

* cited by examiner

*Primary Examiner*—David J. Buttner
(74) *Attorney, Agent, or Firm*—Pillsbury Winthrop LLP

(57) ABSTRACT

The present invention provides a methyl methacrylate resin composition including (A) about 90 to 99% by weight of a methyl methacrylate polymer with a branched structure having a weight average molecular weight of about 80,000 to 400,000 and a molecular weight between branch points, defined by using a z-average molecular weight, of about 30,000 to 500,000 and (B) about 10 to 1% by weight of a high molecular weight methyl methacrylate polymer having a weight average molecular weight of about 1,000,000 to 5,000,000, which exhibits little drawdown in heat molding and is suitable especially for the production of large molded articles by extrusion molding, blow molding and expansion molding.

7 Claims, No Drawings

METHYL METHACRYLATE RESIN COMPOSITION

BACKGROUND OF THE INVENTION

1. Field of the Invention

The present invention relates to a methyl methacrylate resin composition which exhibits little drawdown in heat molding. This resin composition is suitable for the production of molded articles by extrusion molding, blow molding and expansion molding, especially for the production of large molded articles.

2. Description of Related Art

Methyl methacrylate polymers have sufficient rigidity, excellent transparency and excellent weather resistance. Thus the polymers have been widely used for molded articles by injection molding, such as lamp covers and meter covers of automobiles, spectacle lenses and light guide members, and also for extruded boards by extrusion molding, such as signboards and nameplates.

On the other hand, conventional methyl methacrylate polymers can afford only small molded articles because the tension of the melt oriented resin composition is small in blow molding, and therefore much drawdown is caused. Furthermore, it can be molded by foaming only under limited conditions in temperature, molding pressure and the like. Thus resin compositions with both high flowability and little drawdown have been desired.

With regard to improving processing properties in molding, Japanese Unexamined Patent Publication (Kokai) No. 5-140411 has disclosed a method in which polytetrafluoroethylene is added.

Furthermore, U.S. Pat. No. 5,726,268 has disclosed that methyl methacrylate polymer with a branched structure have high tension in melt orientation with retaining melt flowability.

However, in the method wherein polytetrafluoroethylene is added, the drawdown is improved, but sufficient tension in melt orientation necessary for blow molding in large scale can not be achieved. Therefore, the effect of that method is insufficient. In addition, the transparency, which is one of characteristics of acrylic resin, is also lost because polytetrafluoroethylene has a refractive index different from that of methyl methacrylate polymer.

Although the use of the methyl methacrylate polymer with a branched structure can afford acrylic resin having both higher flowability and higher tension in melt orientation compared with those at the time when a conventional linear methyl methacrylate polymers, such acrylic resin does not have drawdown low enough to make the resin applicable also to blow molding in large scale in which a parison having a length more than 40 cm is used. Thus resin which can exhibit still lower drawdown in melt orientation for producing large scale articles has been demanded.

SUMMARY OF THE INVENTION

Accordingly, it is an object of the present invention to provide methyl methacrylate resin composition having remarkably improved tension in melt orientation, namely having reduced drawdown tendency, with remaining sufficient melt flowability, the resin compositions being able to be applied also to blow molding in large scale and extrusion foaming molding.

The present invention provides a methyl methacrylate resin composition comprising: (A) about 90 to 99% by weight of a methyl methacrylate polymer with a branched structure having a weight average molecular weight of about 80,000 to 400,000 and a molecular weight between branch points, defined by using a z-average molecular weight, of about 30,000 to 500,000; and (B) about 10 to 1% by weight of a high molecular weight methyl methacrylate polymer having a weight average molecular weight of about 1,000,000 to 5,000,000.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DETAILED DESCRIPTION OF THE INVENTION

The methyl methacrylate polymer with a branched structure will be explained.

The methyl methacrylate polymer with a branched structure is disclosed in U.S.Pat. 5,726,268, and copolymer of monofunctional monomers containing methyl methacrylate as a main component, and polyfunctional monomers copolymerizable with the monofunctional monomers.

The monofunctional monomers comprising methyl methacrylate mean methyl methacrylate itself, or mixtures of about 50% by weight or more, preferably about 70% by weight or more of methyl methacrylate and at least one other monofunctional monomer copolymerizable with methyl methacrylate. The amount of the copolymerizable monofunctional monomer in the copolymer is preferably not less than about 1% by weight, more preferably not less than about 3% by weight, and especially preferably about 3 to 20% by weight.

When the amount of methyl methacrylate is less than about 50% by weight, the copolymer may not have good transparency and mechanical strength which are the characteristics of the methyl methacrylate polymer.

Examples of the copolymerizable, monofunctional monomers include methacrylates such as ethyl methacrylate, propyl methacrylate, butyl methacrylate and benzyl methacrylate; acrylates such as methyl acrylate, ethyl acrylate, propyl acrylate, butyl acrylate and 2-ethylhexyl acrylate; unsaturated carboxylic acids such as acrylic acid, methacrylic acid, maleic acid and itaconic acid; acid anhydrides such as maleic anhydride and itaconic anhydride; esters having a hydroxyl group such as 2-hydroxyethyl acrylate, 2-hydroxypropyl acrylate, monoglycerol acrylate, 2-hydroxyethyl methacrylate, hydroxypropyl methacrylate and monoglycerol methacrylate; amides such as acrylamide, methacrylamide and diacetone acrylamide. In addition, examples of the monomers include nitriles such as acrylonitrile and methacrylonitrile; nitrogen-containing monomers such as dimethylaminoethyl methacrylate; epoxy group-containing monomers such as allyl glycidyl ether, glycidyl acrylate and glycidyl methacrylate; and styrene monomers such as styrene and α-methylstyrene, and the like.

Examples of the copolymerizable polyfunctional monomers include esterified products prepared by esterifying the terminal hydroxyl groups of ethylene glycol or its oligomer with acrylic acid or methacrylic acid, such as ethylene glycol di(meth)acrylate, diethylene glycol di(meth)acrylate, triethylene glycol di(meth)acrylate and tetraethylene glycol di(meth)acrylate; esterified products prepared by esterifying the hydroxyl groups of dihydric alcohols with acrylic acid or methacrylic acid, such as neopentyl glycol di(meth)acrylate, hexanediol di(meth)acrylate and butanediol di(meth)acrylate; esterified products prepared by esterifying polyhydric alcohols or their derivatives, such as trimethylolpropane and pentaerythritol, with acrylic acid or methacrylic acid; and aryl compounds having two or more alkenyl groups such as divinylbenzene, and the like.

The methyl methacrylate polymer with a branched structure has the weight average molecular weight (Mw) of about 80,000 to 400,000, preferably about 150,000 to 300,000, and the molecular weight between branch points defined by a Z-average molecular weight (Mzb) of about 30,000 to 500,000, preferably about 50,000 to 200,000.

When the weight average molecular weight (Mw) is less than about 80,000, the methyl methacrylate polymer with a branched structure has insufficient mechanical strength and solvent resistance. Moreover, molded articles obtained from the methyl methacrylate resin composition comprising the methyl methacrylate polymer with a branched structure and the high molecular weight methyl methacrylate polymer become poor in strength and solvent resistance.

When the weight average molecular weight (Mw) is more than about 400,000, the methyl methacrylate polymer with a branched structure has too low melt flowability and thus the resulting resin composition has low moldability.

When the molecular weight between branch points (Mzb) is more than about 500,000, the methyl methacrylate polymer with a branched structure loses an advantage in solvent resistance at identical flowability, and the resulting resin composition also loses its advantage in solvent resistance. When Mzb is less than about 30,000, the resin composition has low mechanical strength, and the molded articles obtained from the resin composition have poor appearance.

The weight average molecular weight (Mw) and the z-average molecular weight (Mz) are measured by gel permeation chromatography (GPC) and a differential refractometer. The measuring methods for Mw and Mz are well known in the polymer field.

The methods of their measurement are described, for example, on pages 24–55, "Analysis of Polymer Characteristics" (1984, Kyoritsu Shuppan Co., Ltd.)

The molecular weight between branch points means an average of molecular weights between adjacent branch points of the polymer with a branched structure. This is defined by the z-average molecular weight (Mz).

The molecular weight between branch points (Mzb) is described in "Characterization" (Bulletin of the Japan Rubber Association, Vol. 45, No. 2, pages 105–118) and Polymer J., Vol.3, No.6, (1972)729–738, the disclosure of which is hereby incorporated by reference, and calculated according to Equation 1 and Equation 2 given below.

$$\{[\eta_1]/[\eta_2]\}^{10/6} = \{(1+Bz/6)^{0.5} + 4Bz/3\,\pi\}^{-0.5} \quad \text{Equation 1}$$

$$Mzb = Mz/Bz \quad \text{Equation 2}$$

wherein, in the Equation 1, $[\eta_1]$ represents an intrinsic viscosity at a point at which a molecular weight corresponds to Mz on a calibration curve showing the relationship of an intrinsic viscosity against the absolute molecular weight of the polymer to be analyzed, which a calibration curve has been obtained using a universal calibration curve showing the relationship of the product of the absolute molecular weight and the intrinsic viscosity against the elution time in GPC for the standard sample of a linear methyl methacrylate polymer.

$[\eta_2]$ represents an intrinsic viscosity at a point corresponding to the same Mz as that of the polymer to be analyzed on a calibration curve showing the relationship of an intrinsic viscosity against the absolute molecular weight of the standard sample of a linear methyl methacrylate polymer.

Bz is the number of branch points in the polymer with branched structure having the z-average molecular weight of Mz.

As for the methyl methacrylate polymer with a branched structure in the present invention, it is preferable that the amount of molecules having a molecular weight of 300,000 or more is about $\{[14\times(\text{reduced viscosity})-6.8]$ to $[14\times(\text{reduced viscosity})+11.2]\}$(% by weight) when the methyl methacrylate polymer with a branched structure has a reduced viscosity of 0.7 dl/g or less, and about $\{[40\times(\text{reduced viscosity})-25]$ to $[40\times(\text{reduced viscosity})-7]\}$(% by weight) when the methyl methacrylate polymer with a branched structure has a reduced viscosity of more than 0.7 dl/g.

The reduced viscosity of the methyl methacrylate polymer with a branched structure is a value measured at a polymer concentration of 1 g/dl in chloroform at 25° C.

When the amount of the molecules having a molecular weight of 300,000 or more is in the above range, the methyl methacrylate polymer with a branched structure has good balance between the flowability and solvent resistance and mechanical strength. Therefor, the resin composition using the methyl methacrylate polymer with a branched structure also has good balance between the flowability and solvent resistance and mechanical strength.

The crosslinking degree of the methyl methacrylate polymer with a branched structure, expressed by a gel fraction (% by weight of acetone-insoluble portions to the total weight of the polymer), is usually about 3% or less, preferably about 1% or less, more preferably about 0%.

In general, a tension in melt orientation of a thermoplastic resin can be indicated also by a die swell ratio as an index thereof.

The die swell ratio can be expressed by a value obtained by dividing a strand diameter, which was obtained in the measurement of a melt flow rate at 230° C. under a load of 3.8 kg using a melt indexer with an orifice being 8.0 mm in length and 2.09 mm in diameter, by the diameter of the orifice.

The die swell ratio of the methyl methacrylate polymer with a branched structure is about 1.2 to 2.5.

Methyl methacrylate resin which does not have a branched structure has a die swell ratio of about 1 as disclosed in FIG. 9 in J. Appl. Polym. Sci., 29 (1984), pages 3479–3490.

In other words, it has been shown that the methyl methacrylate polymer with a branched structure has a large die swell ratio, high tension in melt orientation and low drawdown. However, the die swell ratio of the methyl methacrylate polymer with a branched structure is insufficient to provide large molded articles by blow molding or the like.

The methyl methacrylate polymer with a branched structure may be prepared by polymerizing monomers, which become the aforementioned constituting unit, with a predetermined amount of polyfunctional monomer, and further a chain transfer agent and a polymerization initiator.

A polyfunctional chain transfer agent and a poly functional initiator can be used as a chain transfer agent and as a polymerization initiator, respectively.

The amount of the component which becomes the polyfunctional constituting unit is usually about 0.02 to 1% by weight based on the weight of the monofunctional monomer such as methyl methacrylate.

Any well-known chain transfer agents used for polymerization of methyl methacrylate can be employed as the chain transfer agent. The chain transfer agents include monofunctional chain transfer agents having one chain transfer functional group and polyfunctional chain transfer agents having two or more chain transfer functional groups.

Examples of the monofunctional chain transfer agents include alkyl mercaptans and thioglycolic esters and the like.

Examples of the polyfunctional chain transfer agents include esterified products prepared by esterifying hydroxyl groups of polyhydric alcohols, such as ethylene glycol, neopentyl glycol, trimethylolpropane, di(trimethylolpropane), pentaerythritol, dipentaerythritol, tripentaerythritol and sorbitol, with thioglycolic acid or 3-mercaptopropionic acid.

The amount of the chain transfer agent used for the polymerization for forming the methyl methacrylate polymer with a branched structure is usually about $5 \times 10^{-5}$ mole to $5 \times 10^{-3}$ mole per mole of the monofunctional monomer. The amount of the copolymerizable polyfunctional monomer is in such a range that the number of its functional groups is about $1 \times 10^{-5}$ equivalent to {chain transfer agent (mole)$-2.5 \times 10^{-4}$} equivalents per mole of the monofunctional monomer.

The weight average molecular weight of the methyl methacrylate polymer with a branched structure can be adjusted by the concentration of the polyfunctional monomer, the concentration of the chain transfer agent and the concentration of the radical initiator mainly used.

The weight average molecular weight increases with an increase in concentration of the polyfunctional monomer and decreases with an increase in concentration of the chain transfer agent. The weight average molecular weight is accordingly controlled by suitably varying the concentration of the polyfunctional monomer and that of the chain transfer agent in the ranges specified above.

The molecular weight between branch points can be controlled mainly by the concentration of the polyfunctional monomer. The molecular weight between branch points decreases with an increase in concentration of the polyfunctional monomer.

As for the chain transfer agent, when a polyfunctional chain transfer agent is used, the molecular weight between branch points decreases compared with the case in which the same amount of monofunctional chain transfer agent is used. The amount of molecules having a molecular weight of 300,000 or more increases with an increase in concentration of the polyfunctional monomer.

Polymerization initiators include monofunctional polymerization initiators generating one pair of radicals in one molecule and polyfunctional polymerization initiators generating two or more pairs of radicals in one molecule.

When polymerization is terminated at a polymerization rate of 45 to 60% by weight as in the case of bulk polymerization, the amount of terminal vinyl groups formed from the polyfunctional monomers can be decreased by the use of the polyfunctional polymerization initiators having three or more functional groups in comparison with the sole use of the polyfunctional monomers.

Examples of the trifunctional polymerization initiator and tetrafunctional polymerization initiator are tris-(t-butylperoxy)triazine and 2,2-bis(4,4-di-t-butylperoxycyclohexyl)propane, respectively.

In the case of using the polyfunctional polymerization initiator, some or whole part of the polyfunctional constituting units can be replaced by the polyfunctional polymerization initiator.

The amount of the polymerization initiator used may be a well-known appropriate amount according to the method of polymerization, and is usually about 0.001 to 1 part by weight, preferably about 0.01 to 0.7 part by weight based on 100 parts by weight of monomer or a mixture of monomers.

The weight average molecular weight of the methyl methacrylate polymer with a branched structure decreases with an increase in the amount of the polymerization initiator used, like conventional methyl methacrylate polymers.

The methyl methacrylate polymer with a branched structure can be prepared by the application of any well-known polymerization method for industrially manufacturing acrylic resins, for example, suspension polymerization, bulk polymerization and emulsion polymerization. As for reaction conditions of the methyl methacrylate polymer with a branched structure in the suspension polymerization, a reaction temperature, for example, is usually in the range of approximately 60 to 90° C. A reaction time depends on the reaction temperature, and, for example, the reaction reaches the peak in about 1 to 1.5 hours at a reaction temperature of about 70 to 85° C. The temperature is elevated to about 100 to 110° C. after the reaction peak, and the temperature is maintained in that range for about 10 to 30 minutes to complete the reaction. In order to lower the gel fraction, the reaction is preferably carried out under an atmosphere of an inert gas such as nitrogen, helium, argon or the like.

Next, the high molecular weight methyl methacrylate polymer will be explained.

The high molecular weight methyl methacrylate polymer contained in the resin composition of the present invention has a weight average molecular weight (Mw) of about 1,000,000 to 5,000,000, preferably about 1,500,000 to 4,500,000.

When the weight average molecular weight (Mw) is less than about 1,000,000, no sufficient tension can be achieved in blow molding of the resulting resin composition of the present invention, and therefore, no reduction in drawdown can be observed. Furthermore, when the resulting resin composition is extrusion foaming molded, a foamed article can be obtained only under limited foaming conditions in temperature, molding pressure or the like. The weight average molecular weight (Mw) of more than about 5,000,000 results in a decrease in melt flowability and a reduction in melt moldability.

The high molecular weight methyl methacrylate can be prepared by polymerizing methyl methacrylate, or methyl methacrylate and at least one above-mentioned copolymerizable monofunctional monomer in a well-known polymerization method such as suspension polymerization, bulk polymerization and emulsion polymerization. In the polymerization, a polymer with a high molecular weight can be obtained by conducting the polymerization using little chain transfer agent.

Then, the methyl methacrylate polymer composition of the present invention will be explained.

The methyl methacrylate polymer composition of the present invention can be prepared by a well-known method for mixing thermoplastic resins. For example, a method in which every components are once melt kneaded can be employed. The melt kneading may be carried out using a generally used kneading machine such as a single or double screw extruder and various kinds of kneaders to make pellets. Alternatively, the components may be mixed when the final product is melt processed.

Furthermore, one may employ a method in which the high molecular weight methyl methacrylate polymer is polymerized first, and subsequently, a component which will become a polyfunctional constituting unit is added to the remaining monomer to yield the branched polymer.

In addition, one also may use a method in which the high molecular weight methyl methacrylate polymer is dissolved in a mixture of monomers for polymerizing the branched polymer, and polymerized.

In the present invention, as for the amounts of the methyl methacrylate polymer with a branched structure and the high molecular weight methyl methacrylate polymer in the methyl methacrylate resin composition, the amount of the methyl methacrylate polymer with a branched structure is about 90 to 99% by weight, preferably about 91 to 98% by weight. The amount of the high molecular weight methyl methacrylate polymer is about 10 to 1% by weight, preferably about 9 to 2% by weight. When the amount of the high molecular weight methyl methacrylate polymer is more than about 10% by weight, the melt flowability of the resulting composition decreases. When being less than about 1% by weight, the reduction in drawdown in melt orientation becomes insufficient.

Optional addition of a variety of additives which can be added to conventional acrylic resins, such as mold release agents, ultraviolet absorbers, coloring agents, antioxidants, heat stabilizers, plasticizers, fillers, dyes, pigments and light dispersing agents, to the resin composition of the present invention does not cause any problems. The additives may be added in the course of kneading the resin composition or polymerizing the polymers.

Furthermore, impact-resistant acrylic resins other than the methyl methacrylate resin composition of the present invention, for example, acrylic resin containing a fine rubber polymer or rubber polymer itself can be mixed, unless the effect of the present invention is impaired.

In the present invention, the drawdown is evaluated as follows:

Using Capillograph (manufactured by Toyo Seiki Co., Ltd.), resin pellets, which have been dried at 85° C. for 4 hours, are melt extruded, through a 2 mm Ø orifice at a resin temperature of 230° C. and at an extrusion rate of 0.3 g/s, downward into the air to form a 50 cm long strand. After stopping the extrusion, change in length of the strand with time elapsing is measured.

When it takes 0 to 5 seconds for the strand formed from a resin to elongate by 10%, it is difficult to produce large molded articles using the resin. A resin, wherein it takes more than 5 seconds, preferably more than 10 seconds, for a strand formed therefrom to elongate by 10%, permits the production of large molded articles.

The resin composition of the present invention has good solvent resistance, high flowability and little drawdown in blow molding, therefore can be used for production of large molded articles. In the molding of this resin composition with an extruder, a melting down effect in a sheeting process can be reduced, so that good extrusion processability can be exhibited. The heat forming of the resulting sheets or the like can afford good products with little thickness unevenness. The resin composition can widen the molding condition range for injection blow molding and direct blow molding. At the same time, the resulting molded articles are reduced in thickness unevenness. Furthermore, it has become possible for the resin composition to be blow molded in a large scale. This permits the application of large articles such as large bottles, large signboards, light covers, parts of automobiles, peripheral materials of a bathtub, materials for household electrical appliances and the like, which could not be formed from the conventional acrylic resin, to the materials which take advantages of designability, solvent resistance, weather resistance and surface hardness of acrylic resin. Furthermore, the conventional acrylic resin can not afford any sufficient foamed articles, whereas the resin composition of the present invention can provide a foamed article with a high expansion ratio resulted from little escape of gas in foaming.

EXAMPLES

The following Examples will explain the present invention more concretely, but the invention is not limited to the Examples.

Evaluation in the Examples was carried out using the following methods:

(1) Melt Flow Rate (MFR): MFR (g/10 min) was measured under a load of 3.8 kg at 230° C. for 10 minutes in conformity with JIS K7210.

(2) Die swell ratio: A value obtained by dividing a strand diameter by an orifice diameter of 2.09 mm wherein the strand was obtained in the aforementioned measurement of the MFR.

(3) Reduced viscosity: A reduced viscosity of the high molecular weight methyl methacrylate polymer is a value (dl/g) determined at a concentration of 1 g/dl in a chloroform solution at 25° C. in conformity with JIS Z8803. A reduced viscosity of the high molecular weight methyl methacrylate polymer is a value (dl/g) determined at a concentration of 0.1 g/dl.

(4) Weight average molecular weight (Mw) and z-average molecular weight (Mz): Mw and Mz were measured by using a gel permeation chromatography equipped with a differential refractometer and a viscometer (GPC150-CV manufactured by Waters Corp.), and obtained from the molecular weight-elution time calibration curve of the standard methyl methacrylate polymer.

(5) Molecular weight between branch points (Mzb):

An intrinsic viscosity $[\eta_2]$ was obtained as an intrinsic viscosity at a point corresponding to the same Mz as that of the polymer to be analyzed on a calibration curve showing the relationship of an intrinsic viscosity against the absolute molecular weight of the standard sample of a linear methyl methacrylate polymer.

An intrinsic viscosity $[\eta_1]$ was obtained as an intrinsic viscosity at a point corresponding to the same Mz as that of the polymer to be analyzed on a calibration curve showing the relationship of an intrinsic viscosity against the absolute molecular weight of the polymer to be analyzed, which a calibration curve has been obtained from the intrinsic viscosity against the elution time of the polymer to be analyzed using a universal calibration curve showing the relationship of the product of the absolute molecular weight and the intrinsic viscosity against the elution time in GPC for the standard sample of a linear methyl methacrylate polymer.

Bz was obtained from the aforementioned Equation 1 using $[\eta_1]$ and $[\eta_2]$, and then Mzb was calculated from the aforementioned Equation 2.

(6) Evaluation of drawdown

Resin pellets were dried at 85° C. for 4 hours. Using Capillograph (manufactured by Toyo Seiki Co., Ltd.), the resin pellets dried were melt extruded, through a 2 mm Ø orifice at a resin temperature of 230° C. and at an extrusion rate of 0.3 g/s, downward into the air to form a 50 cm long strand. After stopping the extrusion, change in length of the strand with time elapsing was measured, and drawdown was evaluated. The evaluation results are represented as follows:

X: It took 0 to 5 seconds for a strand to elongate by 10%.

Δ: It took more than 5 seconds and not more than 10 seconds for a strand to elongate by 10%

○: It took more than 10 seconds for a strand to elongate by 10%.

Abbreviations of monomers, chain transfer agents and polymers used in Tables are as follows:

MMA: Methyl methacrylate
MA: Methyl acrylate
BA: Butyl acrylate
HDA: 1,6-hexanediol diacrylate
LRSH: Laurylmercaptan
DDSH: n-Dodecylmercaptan
LRPO: Lauroyl peroxide
DBSN: Sodium dodecylbenzenesulfonate
Polymer A: methyl methacrylate polymer with a branched structure
Polymer B: high molecular weight methyl methacrylate polymer Referential Example 1

"Preparation of a methyl methacrylate polymer with a branched structure (Polymer A)"

In a stainless autoclave, the amounts shown in Table 1 of methyl methacrylate, methyl acrylate, lauroyl peroxide, 1,6-hexanediol diacrylate and laurylmercaptan, 200 parts by weight of ion-exchanged water and 1 part by weight of poly sodium methacrylate were mixed and heated to elevate the temperature. Polymerization was started at 80° C. After 90 minutes, the polymerization was continued at 100° C. for 60 minutes. After the polymerization, the mixture was washed, dehydrated and dried to yield the bead polymer (A1). The polymer obtained was evaluated. The evaluation results are shown in Table 1.

TABLE 1

| Referential Examples (Polymer A) | 1 (A1) |
|---|---|
| Monomer composition (parts by weight) | |
| MMA | 89.5 |
| MA | 10.5 |
| LRPO | 0.3 |
| LRSH | 0.41 |
| HDA | 0.1 |
| Evaluation results | |
| Weight average molecular weight ($\times 10^3$) | 155 |
| Reduced viscosity (dl/g) | 0.73 |
| Molecular weight between branch points ($\times 10^4$) | 13 |
| Amount of molecules with molecular weight of 300,000 or more (wt. %) (measured) | 9.4 |
| Upper limit of preferable range (wt. %) (calucurated) | 22.2 |
| Upper limit of preferable range (wt. %) (calculated) | 4.2 |
| MFR (g/10 minutes) | 7.5 |
| Die swell ratio | 1.5 |

Referential Examples 2 to 4

"Preparation of a high molecular weight methyl methacrylate polymer (Polymer B)"

Methyl methacrylate, butyl acrylate or methyl acrylate and a laurylmercaptan solution were mixed with an aqueous solution of sodium carbonate, sodium dodecylbenzenesulfonate and 100 parts by weight of ion-exchanged water in the amounts shown in Table 2 and heated. At 40° C. was added an aqueous potassium persulfate solution, and polymerization was carried out at 83° C. for 3 hours. After the polymerization, the mixture was dried by freeze-drying to yield a bead polymer. The polymer obtained was evaluated. The evaluation results are shown in Table 2 (B1, B2). On the other hand, the amounts shown in Table 2 of methyl methacrylate, methyl acrylate, lauroyl peroxide and laurylmercaptan, 200 parts by weight of ion-exchanged water and 1 part by weight of poly sodium methacrylate were mixed and heated to elevate the temperature. Polymerization was started at 80° C. After 90 minutes, the polymerization was continued at 100° C. for 60 minutes. After the polymerization, the mixture was washed, dehydrated and dried to yield the bead polymer. The polymer obtained was evaluated. The evaluation results are shown in Table 2 (B3, B4).

TABLE 2

| Referential Examples (Polymer B) | 2 B1 | 3 B2 | 4 B3 | 5 B4 |
|---|---|---|---|---|
| Monomer composition (parts by weight) | | | | |
| MMA | 90 | 80 | 70 | 90 |
| BA | 10 | 20 | 30 | — |
| MA | — | — | — | 10 |
| LRSH | 0.01 | — | — | 0.38 |
| DBSN | 0.45 | 0.45 | — | — |
| Sodium carbonate | 0.04 | 0.04 | — | — |
| Potassium persulfate | 0.003 | — | — | — |
| LRPO | — | — | 0.05 | 0.3 |
| Evaluation results | | | | |
| Weight average molecular weight ($\times 10^4$) | 214 | 340 | 201 | 10 |
| Reduced viscosity (dl/g) | 6.89 | 10.8 | 6.42 | 0.59 |

Examples 1 to 4, Comparative Examples 1 to 3

The methyl methacrylate polymer with a branched structure (A) prepared in Referential Example 1 and the high molecular weight methyl methacrylate polymers (B) prepared in Referential Examples 2 to 4 were dry blended uniformly in the composition ratio shown in Table 3 with a mixer. After this, the mixture was melt kneaded in a 30 mm Ø double screw kneading extruder at a cylinder temperature of 250° C. and was pelletized. Using the pellets obtained, the drawdown and the like were evaluated. The evaluation results are shown in Table 3.

TABLE 3

| | Polymer A | Polymer B | | | | | Draw | Appearance |
|---|---|---|---|---|---|---|---|---|
| | A1 | B1 | B2 | B3 | B4 | MFR | down | of strand |
| Comparative Example 1 | 100 | — | — | — | — | 7.5 | x | good |
| Example 1 | 95 | 5 | — | — | — | 3.6 | ○ | good |
| Example 2 | 95 | — | 5 | — | — | 3.9 | ○ | good |
| Example 3 | 95 | — | — | 5 | — | 5.2 | Δ | good |
| Example 4 | 90 | — | 8 | — | — | 2.6 | ○ | good |
| Comparative Example 2 | 85 | — | 15 | — | — | 1.0 | ○ | poor *1 |
| Comparative Example 3 | 95 | — | — | — | 5 | 7.6 | x | good |

*1: "Poor" means that the appearance was poor as a result of the occurence of melt fracture.

The invention being thus described, it will be obvious that the same may be varied in many ways. Such variations are not to be regarded as a departure from the sprit and scope of the invention, and such modifications as would be obvious to one skilled in the art are intended to be included within the scope of the following claims.

What is claimed is:

1. A methyl methacrylate resin composition comprising:
   (A) 90 to 99% by weight of a methyl methacrylate polymer with a branched structure having a weight average molecular weight of 80,000 to 400,000 and a molecular weight between branch points, defined by using a z-average molecular weight, of 30,000 to 500,000; and
   (B) 10 to 1% by weight of a high molecular weight methyl methacrylate polymer having a weight average molecular weight of 1,000,000 to 5,000,000.

2. A methyl methacrylate resin composition according to claim 1, wherein the amount of the methyl methacrylate polymer with a branched structure is 91 to 98% by weight and the amount of the high molecular weight methyl methacrylate polymer is 9 to 2% by weight.

3. A methyl methacrylate resin composition according to claim 1, wherein the weight average molecular weight and the molecular weight between branch points of the methyl methacrylate polymer with a branched structure are respectively 150,000 to 300,000 and 50,000 to 200,000.

4. A methyl methacrylate resin composition according to claim 1, wherein the weight average molecular weight of the high molecular weight methyl methacrylate is 1,500,000 to 4,500,000.

5. A methyl methacrylate resin composition according to claim 1, wherein an amount of molecules having a molecular weight of 300,000 or more in the methyl methacrylate polymer with a branched structure is $\{[14\times(\text{reduced viscosity})-6.8]$ to $[14\times(\text{reduced viscosity})+11.2]\}$(% by weight) when the methyl methacrylate polymer with a branched structure has a reduced viscosity of 0.7 dl/g or less, and $\{[40\times(\text{reduced viscosity})-25]$ to $[40\times(\text{reduced viscosity})-7]\}$(% by weight) when the methyl methacrylate polymer with a branched structure has a reduced viscosity of more than 0.7 dl/g.

6. A methyl methacrylate resin composition according to claim 1, wherein the methyl methacrylate polymer with a branched structure is a polymer prepared by polymerizing methyl methacrylate, a monofunctional monomer copolymerizable with methyl methacrylate, a polyfunctional monomer, a chain transfer agent and a polymerization initiator.

7. A methyl methacrylate resin composition according to claim 1, wherein the high molecular weight methyl methacrylate polymer is a polymer prepared by polymerizing methyl methacrylate, a monofunctional monomer copolymerizable with methyl methacrylate, and a polymerization initiator.

* * * * *